United States Patent [19] [11] Patent Number: 4,976,466
Vauchel [45] Date of Patent: Dec. 11, 1990

[54] THRUST REVERSER FOR A TURBOJET ENGINE
[75] Inventor: Guy B. Vauchel, Le Havre, France
[73] Assignee: Societe anonyme dite Hispano-Suiza, Saint-Cloud, France
[21] Appl. No.: 380,334
[22] Filed: Jul. 17, 1989
[30] Foreign Application Priority Data
Jul. 18, 1988 [FR] France ............................ 88 09671
[51] Int. Cl.$^5$ ............................................. F02K 1/64
[52] U.S. Cl. ............................. 239/265.29; 60/226.2; 239/265.41; 244/110 B
[58] Field of Search ...................... 239/265.25, 265.29, 239/265.39, 265.37, 265.41; 60/226.2; 244/12.5, 23 D, 110 B

[56] References Cited
U.S. PATENT DOCUMENTS 3,486,721 12/1969 Myczinski ...................... 239/265.29
3,612,401 10/1971 Ellis et al. ...................... 239/265.29
3,747,855 7/1973 Vdoviak et al. ............... 239/265.29
4,410,152 10/1983 Kennedy et al. ................ 244/110 B
4,485,970 12/1984 Fournier et al. ............... 239/265.29

FOREIGN PATENT DOCUMENTS
1920829 3/1970 Fed. Rep. of Germany .
2559838 8/1985 France .
2618853 2/1989 France .
1181746 2/1970 United Kingdom .

Primary Examiner—Andres Kashnikow
Assistant Examiner—Michael J. Forman
Attorney, Agent, or Firm—Bacon & Thomas

[57] ABSTRACT

The present invention relates to a thrust reverser for a turbojet engine that improves the efficiency of the engine in both the forward thrust and reverse thrust operating modes. The invention achieves these goals by providing deflector panels attached to a stationary engine housing structure that are moveable between forward thrust and reverse thrust positions as the thrust reversing doors are moved between their forward thrust and reverse thrust positions. The deflector panels are attached to the housing so as to have a single degree of freedom and are actuated by linkages interconnecting them with the thrust reversing door actuator cylinder.

12 Claims, 7 Drawing Sheets

THRUST REVERSER FOR A TURBOJET ENGINE

BACKGROUND OF THE INVENTION

The present invention relates to a thrust reverser for a turbofan-type turbojet engine, more specifically such a thrust reverser incorporating a moveable deflector panel to minimize airstream turbulence in the fan duct.

In a turbofan-type turbojet engine, a cold flow air duct is located concentrically about a primary, hot-gas flow duct such that the upstream end of the cold flow air duct communicates with a fan driven by the turbojet engine. In instances where the bypass ratio is sufficiently high, a thrust reversing device may act on only the cold flow air and be incorporated into the housing defining the outer limits of the cold flow air duct in order to redirect the air passing through the duct into a thrust reversing position.

Figure 1:
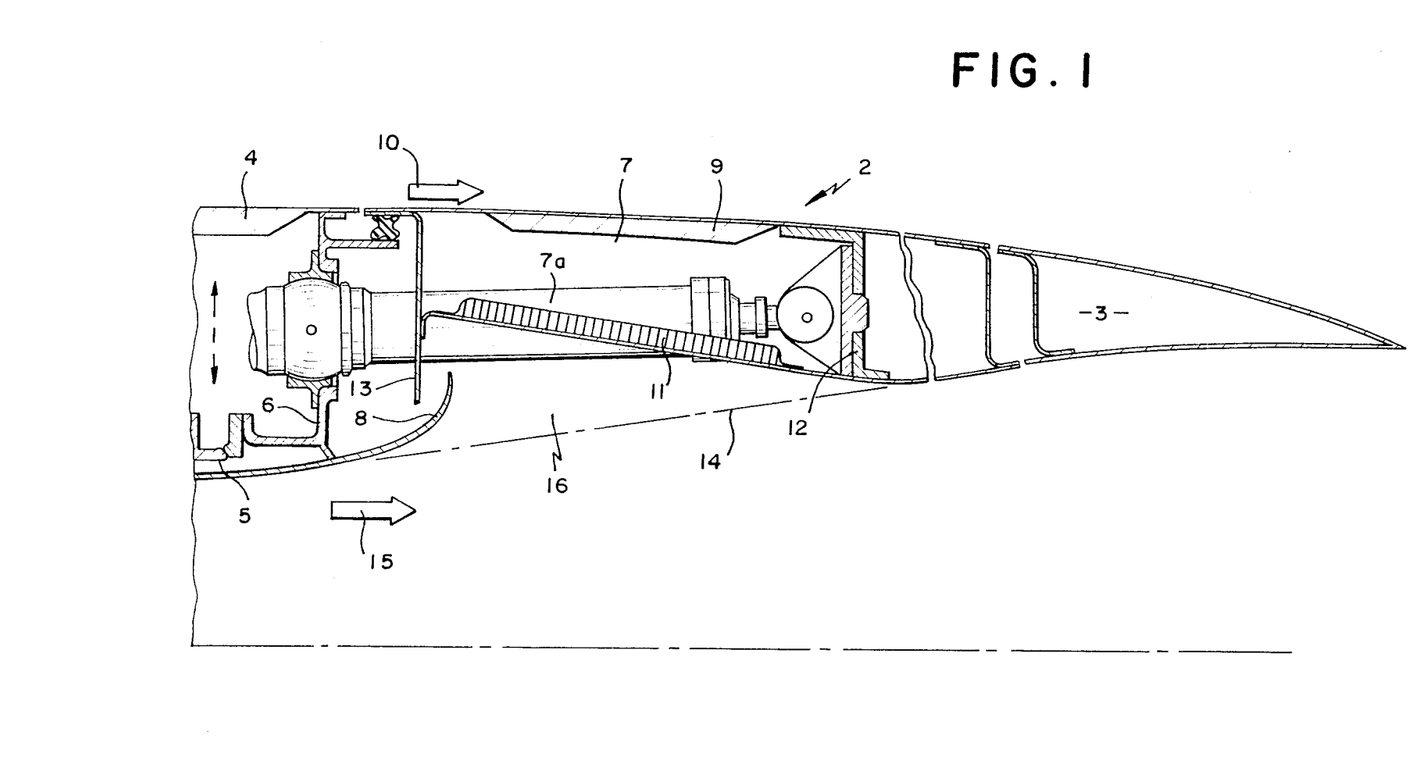
FIG. 1 is a partial, longitudinal cross sectional view showing a thrust reversing door system according to the prior art.
Figure 2A:
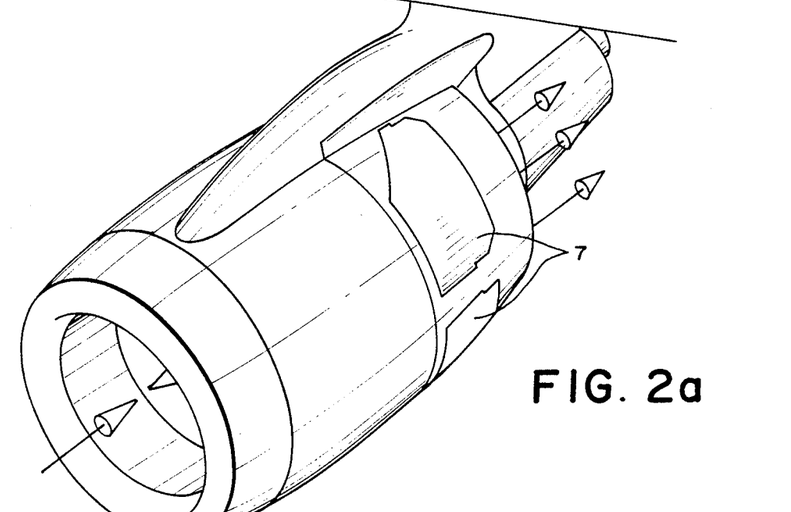
FIGS. 2a and 2b are perspective illustrations of a thrust reversing system with the thrust reversing doors in the closed and opened positions, respectively.
Figure 2B:
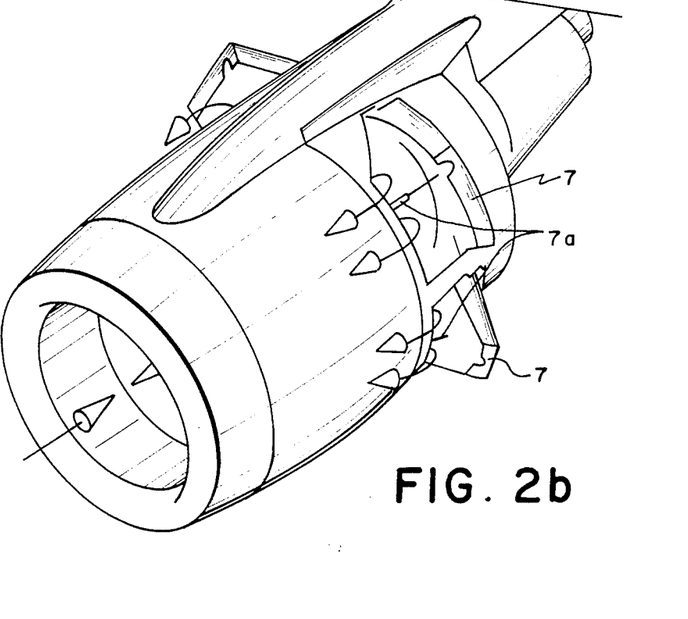

A typical thrust reversing device is shown in FIGS. 1, 2a and 2b. A housing 1 defines the outer limits of the cold flow air duct through which air flows in the direction of arrow 15 when the system is in the forward thrust mode. Housing 1 has an exterior surface panel 4, an interior surface panel 5 and a stationary frame structure 6 joining the downstream ends of the panels 4 and 5. A rear collar 3 extends downstream of a laterally facing opening, which may be covered by thrust reverser 2. The thrust reverser 2 comprises a plurality of thrust reversing doors 7 pivotally attached to the housing and connected to an actuator 7a. Actuator 7a is pivotally attached to stationary frame 6 and generally comprises a cylinder having an extendible and contractible piston rod connected to the door 7. Thrust reverser door 7 comprises an outer surface panel 9 and an inner surface panel 11 joined at their forwardmost ends by a reverse thrust deflector 13.

The door 7 is shown in the closed, forward thrust position in FIG. 1 wherein the laterally facing opening in the housing is closed and the air in the cold flow air duct passes in the direction of arrow 15. The outer surface panel 9 is substantially flush with the exterior surface panel 4 and the rear cone 3 to provide a smooth external air flow in the direction of arrow 10. FIG. 2a shows the turbofan type turbojet engine with the thrust reverser doors 7 in their closed positions.

When the doors 7 are displaced to their open, thrust reversing positions, the left side (as viewed in FIG. 1) is displaced upwardly (outwardly of the exterior surface 14) while the downstream end of the door 7 is displaced into the cold flow air duct. This position is illustrated in FIG. 2b wherein it can be seen that the laterally extending opening of the housing is opened and the downstream portion of the thrust reversing door 7 blocks off the cold flow air duct so as to redirect the air outwardly through the lateral opening to provide a thrust reversing force to the engine structure.

As best seen in FIG. 1, the inner surface panel 11 slopes toward the outer surface panel 9 in the upstream direction (toward the left as seen in FIG. 1). This enables reverse thrust deflector 13 to extend beyond the surface of the inner surface panel 11 to provide a more efficient air flow when the door is in the thrust reversing position. However, when door 7 is in the forward thrust position, a cavity 16 is created bounded by the inner surface panel 11, edge deflector 8 (fixedly attached to interior surface panel 5) and line 14, which is the theoretical smooth air flow line interconnecting the interior surface panel 5 with the downstream portion of door 7 and the rear collar 3. When the doors are in their closed, forward thrust positions, this cavity causes disturbances in the air flow passing through the cold flow air duct, thereby reducing the efficiency of the engine.

The air flow through the cold flow air duct can be made more efficient by moving the inner surface panel 11 closer toward the ideal air flow line 14, however, this reduces the length of the reverse thrust deflector 13 extending beyond the surface of inner surface panel 11 and reduces the efficiency of the system in the thrust reversing mode.

Attempts have been made to avoid these problems, as illustrated by U.S. Pat. Nos. 4,410,152 and 4,485,970 as well as French Pat. Nos. 2,559,838 and 2,618,853. While the structures set forth in these documents have improved the operational efficiency of the thrust reversers, they require a complex mechanism which increases complexity of the thrust reverser system and inherently reduces its reliability.

SUMMARY OF THE INVENTION

The present invention relates to a thrust reverser for a turbojet engine that improves the efficiency of the engine in both the forward thrust and reverse thrust operating modes. The invention achieves these goals by providing deflector panels attached to the stationary engine housing structure that are moveable between forward thrust and reverse thrust positions as the thrust reversing doors are moved between their forward thrust and reverse thrust positions. The deflector panels are attached to the housing structure so as to have a single degree of freedom and are actuated by linkages interconnecting them with the thrust reversing door actuator cylinder.

In the reverse thrust position, the deflector panels smooth the air flow as it is directed through the lateral opening in the housing to also increase the efficiency of the device when in the thrust reversing mode.

The deflector panels may be formed in segments so as to extend around the longitudinal axis of the housing. The deflector panels may have a driving panel with driven panels located adjacent to such driving panels and connected to them such that actuation of the driving panels also actuates the driven panels.

In an alternative embodiment, the deflector panels are attached to the stationary frame of the housing so as to slide in a generally radial direction. A cam actuated by a linkage mechanism connected to the actuator casing moves the deflector panels between their forward thrust and reverse thrust positions as the actuator casing moves during movement of the thrust reversing doors.

DETAILED DESCRIPTION OF THE PREFERRED EMBODIMENTS

The first embodiment of the thrust reverser according to the present invention is illustrated in FIGS. 3–7. The structural features of the known thrust reverser systems are indicated by the same numbers as the known structure set forth in FIG. 1. These elements include the housing 1 having an exterior surface panel 4 and an interior surface panel 5 interconnected by a stationary frame portion 6. An actuator 7a is pivotally attached to the stationary frame portion 6 and has an extendible and retractable rod to move the door 7 between forward thrust and reverse thrust positions.

Figure 3:
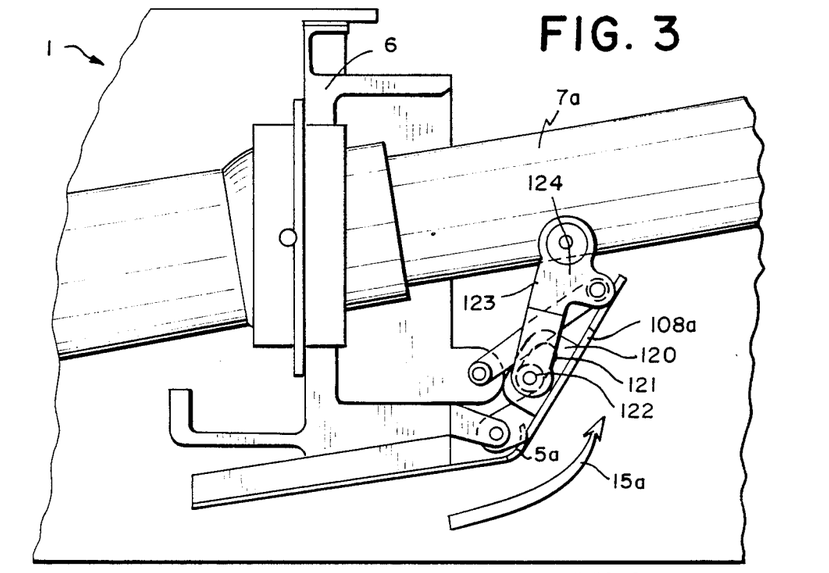
FIG. 3 is a partial, cross sectional view taken along line III—III in FIG. 5 of the thrust reversing system according to the invention, showing a deflector panel in the thrust reversing position.
Figure 4:
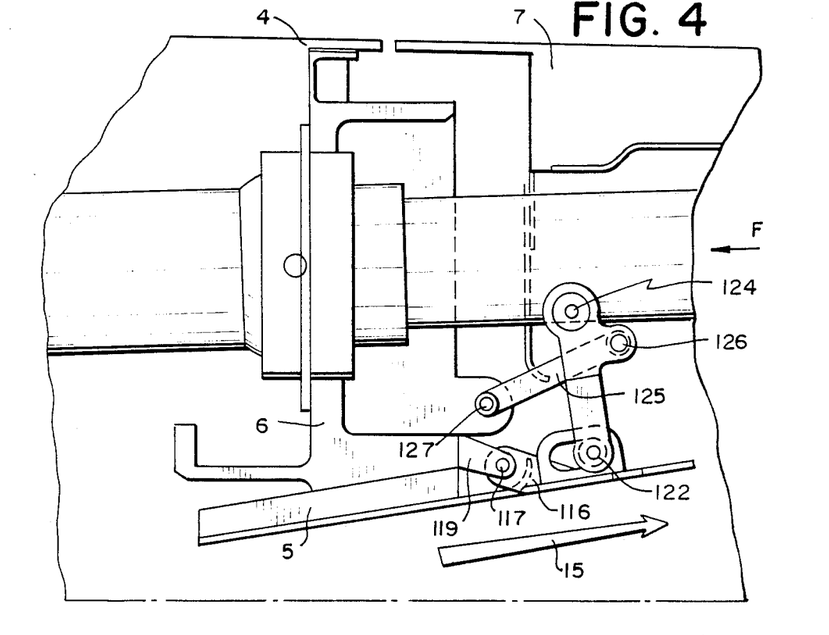
FIG. 4 is a cross sectional view similar to FIG. 3, but showing a deflector panel in the forward thrust position.
Figure 6:
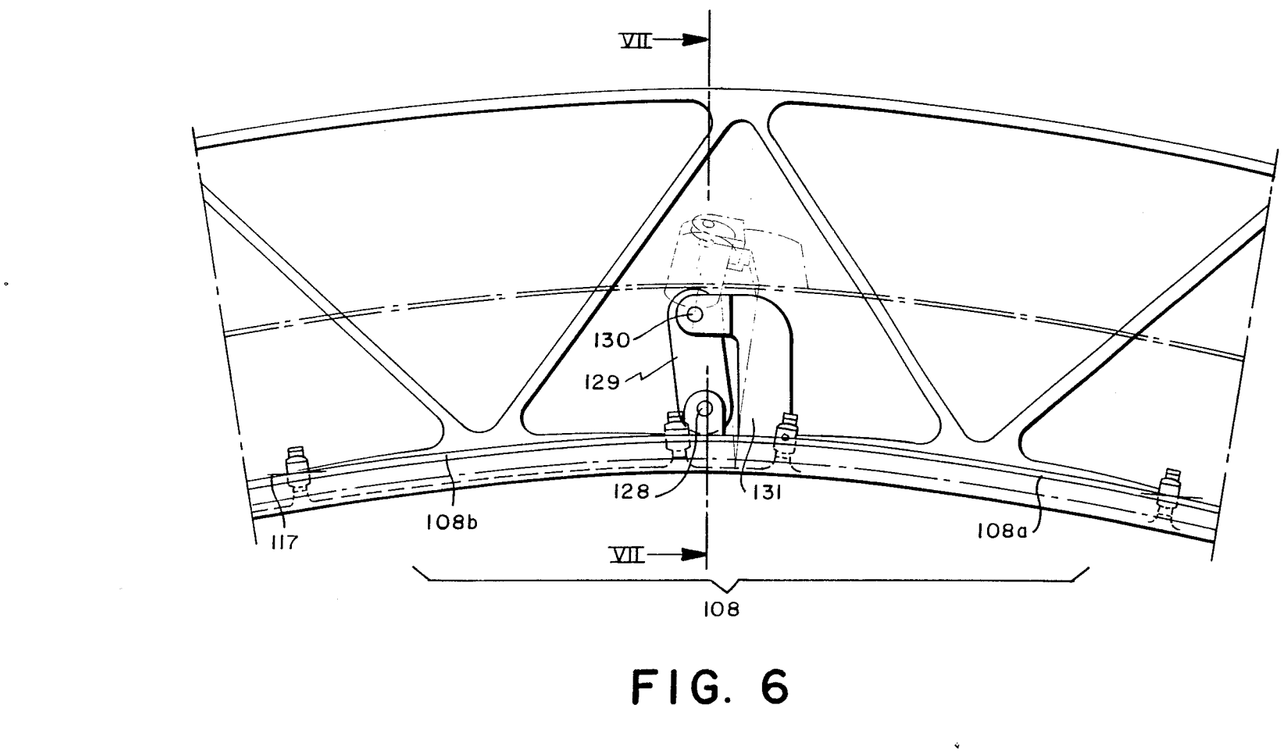
FIG. 6 is a partial, rear view illustrating the linkage interconnecting adjacent deflector panels.
Figure 7:
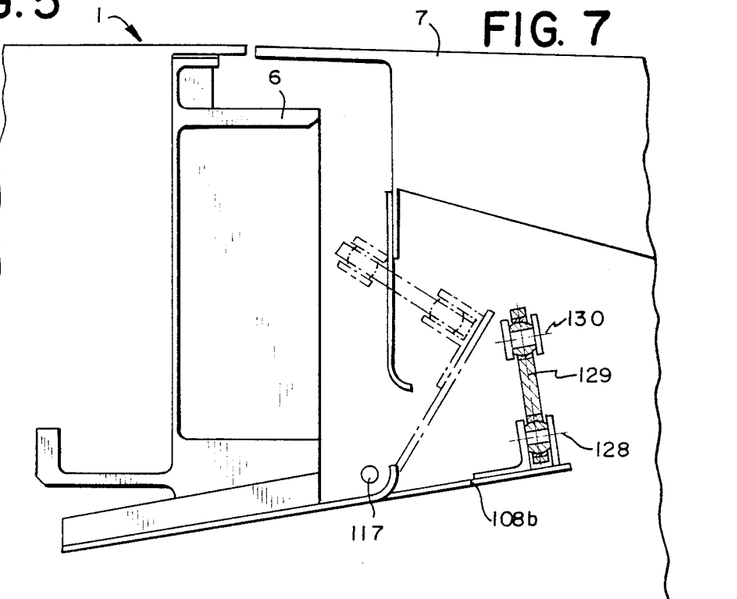
FIG. 7 is a partial cross-sectional view taken along line VII—VII in FIG. 6.

The invention comprises moveable deflector panels 108 pivotally attached to stationary frame portion 6. The deflector panels 108 may be divided into a plurality of adjacent deflector panels, each forming a segment of a generally annular structure extending around the longitudinal axis of the housing. The deflector panels 108 may be comprised of driving deflector panel segments 108a and driven deflector panel segments 108b. The structure and operation of the driving deflector panel segments 108a are illustrated in FIGS. 3–5, while the interconnection of the driving and driven deflector panel segments 108a and 108b are illustrated in FIGS. 6 and 7.

Each driving deflector panel segment 108a has a support 116 that is pivotally attached at 117 to a fork 118 formed on the end of a stationary support 119 that is fixedly attached to the stationary frame 6. Thus, each deflector panel 108 is pivotable about a axis that extends generally laterally of the longitudinal axis of the housing 1.

Figure 5:
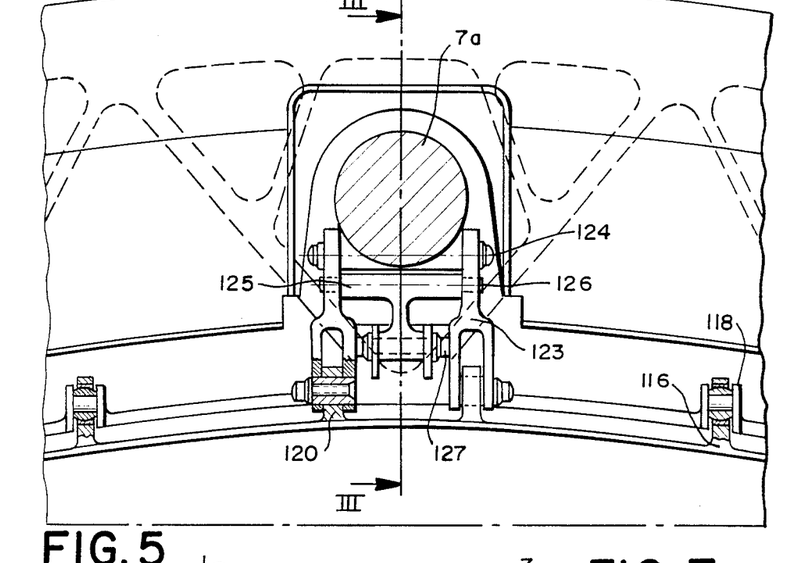
FIG. 5 is a partial rear view taken in the direction of arrow F in FIG. 4.

As illustrated in FIG. 5, two such connections 116–119 are provided for each of the driving deflector panel segments 108a. A tab 120 extends from the deflector panel 108a and defines a slot 121 therethrough. The slot 121 slidably accepts a roller 122 pivotally mounted on an end of link rod 123. The opposite end of link rod 123 is pivotally attached to the casing of actuator 7a at pivot 124. In the embodiment shown, each driving deflector panel segment 108a may have two link rods 123 connected thereto, one link rod being located on each side of the actuator 7a as illustrated in FIG. 5.

A second link rod 125 is pivotally interconnected between link rod 123 at 126, as well as the stationary frame portion 6 at 127. Second link rod 125 may be located between link rods 123, as shown in FIG. 5, if desired.

The interconnection between driving deflector panels 108a and adjacent driven deflector panels 108b is illustrated in FIGS. 6 and 7, and comprises a first connecting member 131 fixedly attached to the deflector panel 108a and having a generally inverted "L" shape with a distal end. A second connecting member 129 is pivotally attached to a driven deflector panel 108b at 128 and to the distal end of connecting member 131 at pivot 130. The driven deflector panel segments 108b are attached to the stationary frame portion 6 by elements 116–119 as previously described in regard to the driving deflector panel segment 108a.

The positions of the various pivot connections, and in particular the pivot connection 128, is determined so as to provide an aerodynamic continuity of the contours of the driving and driven deflector panel segments 108a and 108b in both the forward thrust and reverse thrust positions. In the forward thrust positions, as illustrated in FIGS. 4 and 7, the deflector panel segments 108a and 108b form an extension of the interior surface panel 5 in order to direct the air passing in the direction of arrow 15 along the theoretical air flow line 15. This provides a more efficient air flow through the cold flow air duct resulting in a more efficient operation.

In the thrust reversing positions, as illustrated in FIG. 3 and in dashed lines in FIGS. 6 and 7, the pivoting of actuator 7a as the thrust reversing door 7 is moved into its thrust reversing position pivots the deflector panel segments 108a about their pivot attachments 117. At the same time, the interconnection with the driven deflector panel segments 108b causes them to also rotate about their pivot attachments 117 into the positions shown in FIG. 3. The deflector panels 108a and 108b define an optimal profile for the flow of air in the direction of arrow 15a, laterally through the openings in the housing, to improve the performance of the system during the thrust reversing mode.

As illustrated in FIG. 1, the primary function of the previous deflector edges 8, which were fixed to the interior surface panel 5, was to direct the air flow during the thrust reversing operation. The deflector panels 108 according to the invention not only provide this function, but also improve the air flow efficiency through the cold flow air duct during the forward thrust mode.

A second embodiment of the thrust reverser according to the invention is shown in FIGS. 8–11. In this embodiment, the deflector panels 208 are moveable in a direction generally perpendicular to the longitudinal axis of the engine housing 1. The deflector panels 208 have guide rods 232 extending therefrom which are slidably engaged with guide sleeves 233, fixedly attached to the stationary frame portion 6. A spring 236 extends between an upper edge of the guide sleeve 233 and a collar 232a, affixed to guide rod 232, to bias the deflector panels 108 in a generally radially outward direction. The guide sleeves 233 may be attached to the stationary frame portion 6 by means of a plate 234 and rivets or screws 235.

Figure 10:
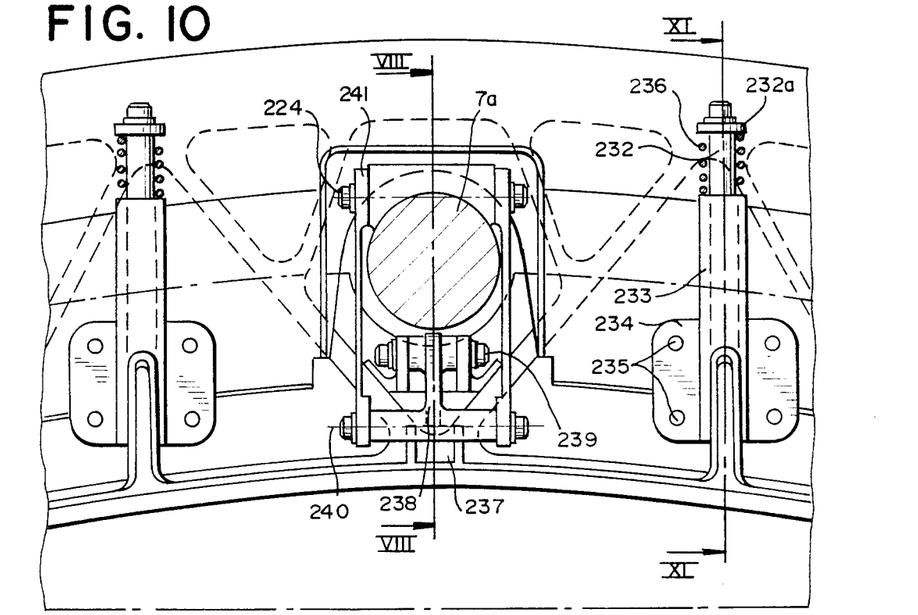
FIG. 10 is a partial, sectional view taken along line X—X in FIG. 9.

Deflector panels 208 also have, on their radially outer surface, a cam follower wheel 237 rotatably attached to the deflector panel 208. A cam 238 is pivotally attached to the stationary frame structure 6 at pivot 239, as well as to link rod 241 at pivot 240. The opposite end of link rod 241 is pivotally attached to the actuator 7a at pivot 224. As illustrated in FIG. 10, a pair of link rods 241 may be utilized and be located on either side of the actuator 7a.

Figure 9:
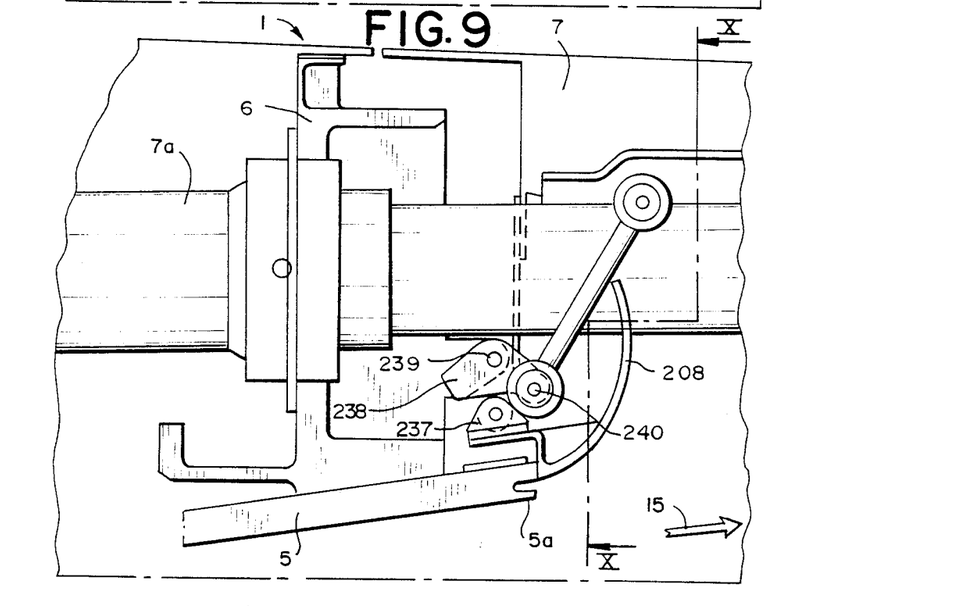
FIG. 9 is a view similar to FIG. 8 showing the deflector panel in its forward thrust position.
Figure 11:
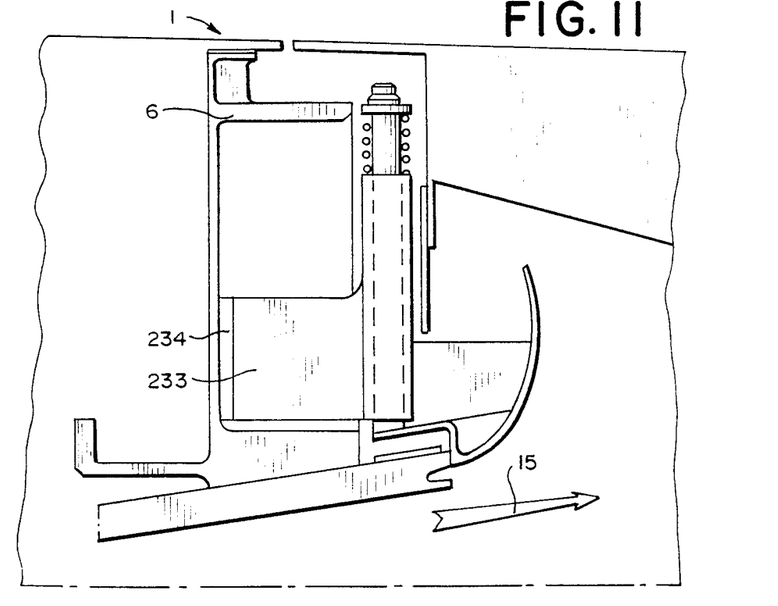
FIG. 11 is a partial cross-sectional view taken along the line XI—XI in FIG. 10.

When the engine is in its forward thrust mode of operation, the deflector panel 208 assumes the position shown in FIGS. 9–11 to avoid any interference in the air flow passing over the interior surface wall 5. The springs 236 bias the deflector panels 208 such that cam follower wheel 237 is in contact with cam 238. In this position, the deflector is disposed away from lip 5a formed on the interior surface panel 5 to provide a smooth air flow through the cold flow air duct in the direction of arrow 15.

Figure 8:
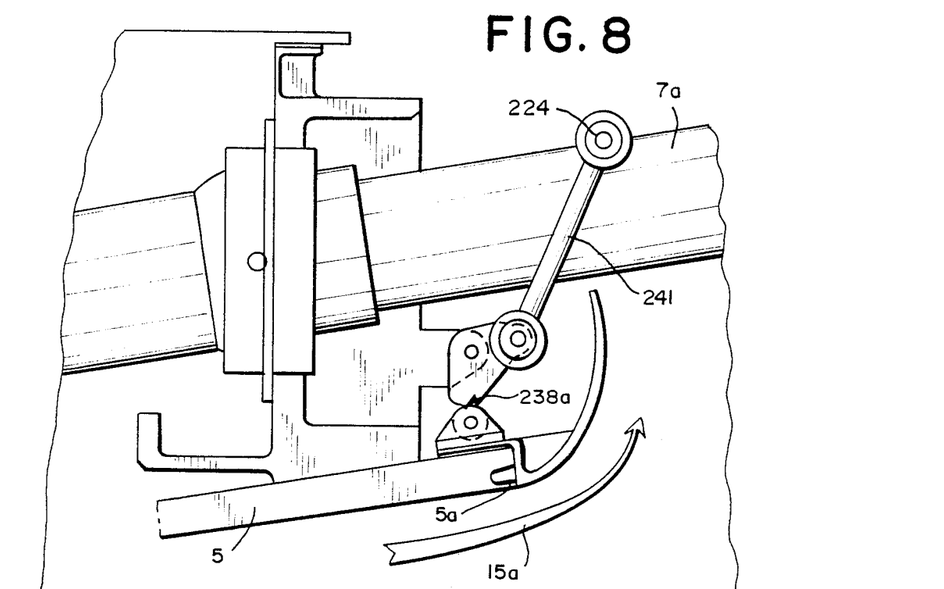
FIG. 8 is a partial, longitudinal sectional view taken along line VIII—VIII of FIG. 10 illustrating a deflector panel according to a second embodiment of the invention in its thrust reversing position.

Pivoting movement of the actuator 7a in moving the thrust reversing door 7 to the thrust reversing position pivots the cam 238 about its pivot point 239 such that cam surface 238a contacts the cam follower wheel 237 to urge the deflector panel 208 in a downward, radially inward direction as illustrated in FIG. 8. In this position, deflector panel 208 is substantially flush with the inner surface of the interior surface panel 5 in order to provide a smooth air flow in the direction of arrow 15a through the lateral opening in the housing.

The foregoing description is provided for illustrative purposes and should not be construed as in any way limiting this invention, the scope of which is defined solely by the appended claims.

I claim:

1. A thrust reverser for a turbojet engine having a housing extending around a longitudinal axis of the engine with an exterior surface, an interior surface defining an outer boundary of a cold gas flow duct and defining a lateral opening, the thrust reverser comprising:
    (a) a thrust reversing door attached to the housing so as to be movable between a first, forward thrust position wherein an outer surface of the door is substantially flush with the exterior surface of the housing and the door covers the lateral opening, and a second, reverse thrust position wherein the lateral opening is uncovered and the door directs the gas through the lateral opening to provide a reverse thrust force;
    (b) a stationary frame extending between the exterior and interior surfaces of the housing;
    (c) actuator means pivotally connected to the frame and the door to move the door between its first and second positions;
    (d) deflector means attached to the frame with a single degree of freedom, and movable between a first, forward thrust position and a second, reverse thrust position, said deflector means directing gas flow in both said first and second positions; and,
    (e) linkage means connecting the deflector means to the actuator means such that pivoting motion of the actuator means as it moves the thrust reverser door between its first and second positions moves the deflector means between its first and second positions.

2. The thrust reverser according to claim 1 wherein the deflector means comprises a plurality of deflector panels, each pivotally attached to the stationary frame so as to pivot about an axis extending generally laterally with respect to the longitudinal axis of the housing.

3. The thrust reverser according to claim 2 wherein the linkage means comprises:
    (a) a first link rod having a first end pivotally attached to the actuating means and a second end;
    (b) attaching means attaching the second end of the first link rod to a deflector panel; and,
    (c) a second link rod pivotally connected between the first link rod and the stationary frame.

4. The thrust reverser according to claim 3 wherein the attaching means comprises:
    (a) a tab extending from the deflector panel defining a slot therein; and,
    (b) roller means rotatably attached to the second end of the first link rod and slidably engaging the slot.

5. The thrust reverser according to claim 2 wherein the plurality of deflector panels comprise at least one driving deflector panel and at least one driven deflector panel; and means connecting the driving and driven deflector panels such that motion of the driving deflector panel is imparted to the driven deflector panel.

6. The thrust reverser according to claim 5 wherein the connecting means comprises:
    (a) a first connecting member fixedly attached to the driving deflector panel and having a distal end;
    (b) a second connecting member pivotally attached to the distal end of the first connecting member and the driven deflector panel.

7. The thrust reverser according to claim 6 wherein the linkage means comprises:
    (a) a first link rod having a first end pivotally attached to the actuating means and a second end;
    (b) attaching means attaching the second end of the first link rod to a deflector panel; and,
    (c) a second link rod pivotally connected between the first link rod and the stationary frame.

8. The thrust reverser according to claim 7 wherein the attaching means comprises:
    (a) a tab extending from the deflector panel defining a slot therein; and,
    (b) roller means rotatably attached to the second end of the first link rod and slidably engaging the slot.

9. The thrust reverser according to claim 1 wherein the deflector means comprises a plurality of deflector panels, and means to slidably attach each to the stationary frame so as to move in directions generally perpendicular to the longitudinal axis of the housing.

10. The thrust reverser according to claim 9 wherein the linkage means comprises:
    (a) a first link rod having a first end pivotally attached to the actuator means and a second end;
    (b) cam means pivotally attached to the stationary frame and to the second end of the first link rod; and,
    (c) cam follower means attached to a deflector panel so as to bear against the cam means.

11. The thrust reverser according to claim 10 wherein the attachment means comprises:
    (a) a guide sleeve fixedly attached to the stationary frame; and,
    (b) a guide rod attached to a deflector panel and slidably received in the guide sleeve.

12. The thrust reverser according to claim 11 further comprising spring means interposed between the guide sleeve and the guide rod to bias the deflector panel in a direction such that the cam follower means is urged into contact with the cam means.

* * * * *

UNITED STATES PATENT AND TRADEMARK OFFICE
CERTIFICATE OF CORRECTION

PATENT NO. : 4,976,466

DATED : December 11, 1990

INVENTOR(S) : VAUCHEL

It is certified that error appears in the above-identified patent and that said Letters Patent is hereby corrected as shown below:

Column 4, line 20, "15" should be --14--.

Signed and Sealed this

Twelfth Day of January, 1993

Attest:

DOUGLAS B. COMER

*Attesting Officer*       *Acting Commissioner of Patents and Trademarks*